United States Patent
Nakahara et al.

(10) Patent No.: US 7,049,726 B2
(45) Date of Patent: May 23, 2006

(54) STATOR FOR DYNAMO-ELECTRIC MACHINE

(75) Inventors: Yuuji Nakahara, Tokyo (JP); Naohiro Oketani, Tokyo (JP); Katsumi Adachi, Tokyo (JP); Akira Morishita, Kobe (JP); Hiroshi Matsui, Tokyo (JP); Tsuyoshi Takahashi, Tokyo (JP); Takushi Takizawa, Tokyo (JP); Yoshihito Asao, Kobe (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/377,740

(22) Filed: Mar. 4, 2003

(65) Prior Publication Data

US 2003/0189387 A1   Oct. 9, 2003

Related U.S. Application Data

(63) Continuation of application No. 09/734,684, filed on Dec. 13, 2000, now abandoned.

(30) Foreign Application Priority Data

Dec. 27, 1999   (JP) .................................. 11-368956

(51) Int. Cl.
   *H02K 1/12* (2006.01)
(52) U.S. Cl. ..................................................... 310/217
(58) Field of Classification Search ........ 310/216–218, 310/254–258, 91
See application file for complete search history.

(56) References Cited

U.S. PATENT DOCUMENTS

| | | | |
|---|---|---|---|
| 1,756,672 A | 4/1930 | Barr | |
| 3,469,136 A | 9/1969 | Jenkinson | |
| 3,774,062 A | 11/1973 | Johnson | |
| 3,783,318 A | 1/1974 | Widstrand | |
| 4,140,935 A * | 2/1979 | Braun et al. | 310/224 |
| 4,384,226 A | 5/1983 | Sato et al. | |
| 4,392,073 A * | 7/1983 | Rosenberry, Jr. | 310/216 |
| 4,698,539 A * | 10/1987 | Workman | 310/216 |
| 4,712,035 A * | 12/1987 | Forbes et al. | 310/269 |
| 4,912,353 A | 3/1990 | Kondo et al. | |
| 5,831,366 A * | 11/1998 | Kern et al. | 310/216 |
| 5,859,486 A | 1/1999 | Nakahara et al. | |
| 6,023,119 A | 2/2000 | Asao | |
| 6,211,587 B1 * | 4/2001 | Enomoto et al. | 310/52 |
| 6,225,725 B1 * | 5/2001 | Itoh et al. | 310/254 |
| 6,265,802 B1 * | 7/2001 | Getschmann | 310/216 |

(Continued)

FOREIGN PATENT DOCUMENTS

JP   51-52902   11/1976

(Continued)

*Primary Examiner*—Tran Nguyen
(74) *Attorney, Agent, or Firm*—Sughrue Mion, PLLC

(57) ABSTRACT

The invention provides a stator for a dynamo-electric machine capable of preventing deterioration of efficiency. In the stator for dynamo-electric machine of which rotor is disposed inside the stator, a stator core 11 comprises: an inside ring core 9 formed annularly by laminating plate-type magnetic members in which a plurality of teeth are provided on one side of a yoke portion, disposing coils 8 in slots each formed between the teeth, bending the plate-type magnetic members so that the coils 8 are located inside, and bringing two end faces into contact with each other; and an outside ring core 10, being made of magnetic members and formed cylindrical in shape, which is fitted on outside of the inside ring 9 and holds the inside ring core 9.

16 Claims, 20 Drawing Sheets

U.S. PATENT DOCUMENTS 6,265,804 B1 * 7/2001 Nitta et al. .................. 310/259

FOREIGN PATENT DOCUMENTS

| JP | 57-183236 | 11/1982 |
| --- | --- | --- |
| JP | 4-503749 | 7/1992 |
| JP | 8-19196 | 1/1996 |
| JP | 9-103052 | 4/1997 |
| JP | 10-234159 | 9/1998 |
| JP | 11-32454 | 2/1999 |
| JP | 11-187594 | 7/1999 |
| JP | 11-215745 | 8/1999 |
| JP | 11-308790 | 11/1999 |

* cited by examiner

【図24】

STATOR FOR DYNAMO-ELECTRIC MACHINE

This application is a continuation of Ser. No. 09/734,684 filed on Dec. 13, 2000 now abandoned.

BACKGROUND OF THE INVENTION

1. Technical Field

The present invention relates to a construction of a stator for use in dynamo-electric machine including alternator for vehicles.

2. Background Art

Generally in conventional stators for dynamo-electric machine, a plurality of teeth are disposed at the inside perimeter of a cylindrical magnetic member, and coils are disposed inside the slots formed between the teeth. In such a construction, coil insertion is a rather complicated work, and it is difficult to dispose high-density coils in the slots.

To cope with this problem, a method has been proposed, for example, in the Japanese Patent Publication (unexamined) No. 103052/1997. To make easy the coil insertion work and the disposition of high density coils in slots, this known method proposed that a rectangular parallelepiped-shaped laminated body is arranged by laminating plate-type magnetic members, each having a plurality of teeth on one side of a yoke portion, and after inserting the coils into slots formed between the teeth thereof, the laminated body is annularly bent with the coil disposition side inward.

FIG. 33 is a front view of a conventional type stator for dynamo-electric machine of this type. FIGS. 34 (A) and (B) show a manufacturing process of the stator for dynamo-electric machine shown in FIG. 33. FIG. 34 (A) is a front view before inserting coils and FIG. 34 (B) is a front view after inserting the coils.

In the drawings, numeral 1 is a stator core formed in such a manner that a rectangular parallelepiped-shaped laminated body 3 is formed into one piece by laminating a required number of plate-type magnetic numbers 2, each having a plurality of teeth 2b on one side of a yoke portion 2a, and then is annularly bent so that both ends are brought into contact with each other and then fixedly connected by welding. Numeral 4 is coils inserted and disposed through slots 2c formed between the teeth 2b.

Referring now to the drawings, a manufacturing process of the conventional stator for dynamo-electric machine of the above-mentioned construction will be hereinafter described.

First, a required number of plate type magnetic members 2, each having a plurality of teeth 2b on one side of a yoke portion 2a, are formed by punching and then laminated and joined together to form a rectangular parallelepiped-shaped laminated body 3. Then, after inserting and disposing the coils 4 through the slots 2c thereof as shown in FIG. 34 (B), the laminated body 3 is annularly bent by a molding machine (not shown) so that both end portions are brought into contact with each other and then fixedly integrated by welding. Thus, a stator for dynamo electric machine is manufactured.

In the conventional stator for dynamo-electric machine having such a construction as described above, because a laminated body 3 is bent after inserting the coils 4 therein, it is certainly possible to conduct easily the coil insertion work and dispose the coils 4 with high density. However, the yoke portion 2a is required to have a certain thickness to secure a necessary cross sectional area for magnetic path and, therefore, a stronger power is required to bend annularly the laminated body of large thickness. Consequently, a problem exists in that an air gap is formed between both end portions as shown in FIG. 35, and it is difficult to obtain a structurally perfect circle. Moreover, a further problem exists in that the laminated body 3 is distorted to the extent of decreasing magnetic performance, eventually resulting in deterioration of efficiency.

SUMMARY OF THE INVENTION

The present invention was made to resolve the above-discussed problems and has an object of providing a stator for dynamo-electric machine capable of being easily formed into a perfect circle and preventing deterioration of efficiency.

The invention provides a stator for dynamo-electric machine of which rotor is disposed inside the stator, in which a stator core comprises: an inside ring core formed annularly by laminating plate-type magnetic members in which a plurality of teeth are provided on one side of a yoke portion, disposing coils in slots each formed between the teeth, bending the magnetic members so that the coils are located inside, and bringing two end faces into contact with each other; and an outside ring core, being made of magnetic members and formed cylindrical in shape, which is fitted on outside of the inside ring and holds the inside ring core. As a result of such construction, it is possible to provide a stator for dynamo-electric machine capable of being easily formed into a perfect circle and preventing deterioration of efficiency.

The invention provides a stator for dynamo-electric machine, in which the outside ring core is formed by laminating plate-type magnetic members. As a result of such construction, it is possible to provide a stator for dynamo-electric machine capable of further preventing deterioration of efficiency.

The invention provides a stator for dynamo-electric machine, in which the outside ring core is formed by laminating the plate-type magnetic members which are wound spirally. As a result of such construction, it is possible to provide a stator for dynamo-electric machine capable of being easily processed as well as preventing deterioration of efficiency.

The invention provides a stator for dynamo-electric machine, in which thickness of the plate-type magnetic members for the outside ring core is larger than that for the inside ring core. As a result of such construction, it is possible to provide a stator for dynamo-electric machine capable of improving rigidity as well as preventing deterioration of efficiency.

The invention provides a stator for dynamo-electric machine, in which thickness of plate-type magnetic members for the outside ring core is smaller than that for the inside ring core. As a result of such construction, it is possible to provide a stator for dynamo-electric machine capable of further preventing deterioration of efficiency.

The invention provides a stator for dynamo-electric machine, in which the outside ring core is formed shorter than the inside ring core in axial direction and is fitted in the central part of the inside ring core. As a result of such construction, it is possible to provide a stator for dynamo-electric machine capable of being easily held by a bracket.

The invention provides a stator for dynamo-electric machine, in which thickness of the outside ring core in radial direction is larger than that of the yoke portion in the inside ring core. As a result of such construction, it is possible to provide a stator for dynamo-electric machine capable of improving rigidity.

The invention provides a stator for dynamo-electric machine, in which thickness of the yoke portion in the inside ring core in radial direction is larger than that of the outside ring core. As a result of such construction, it is possible to provide a stator for dynamo-electric machine capable of further preventing deterioration of efficiency.

The invention provides a stator for dynamo-electric machine, in which concave portions extending in axial direction are respectively provided at positions each substantially corresponding to the central part of the bottom portion of each slot on the outside perimeter of the inside ring core. As a result of such construction, it is possible to provide a stator for dynamo-electric machine capable of improving working efficiency.

The invention provides a stator for dynamo-electric machine, in which concave portions extending in axial direction are respectively provided at positions each substantially corresponding to the central part of the bottom portion of each slot of the inside ring core. As a result of such construction, it is possible to provide a stator for dynamo-electric machine capable of improving working efficiency without decreasing magnetic performance.

The invention provides a stator for dynamo-electric machine, in which the outside ring core is formed by integrating a plurality of arc-shaped magnetic members 33a in one piece. As a result of such construction, it is possible to provide a stator for dynamo-electric machine capable of improving working efficiency and improving yielding percentage of materials.

The invention provides a stator for dynamo-electric machine, in which concave and convex portions engaging with each other are formed on a face where the inside ring core and the outside ring core are fitted to each other. As a result of such construction, it is possible to provide a stator for dynamo-electric machine capable of improving rigidity.

The invention provides a stator for dynamo-electric machine, in which the concave and convex portions are formed to dovetail with each other. As a result of such construction, it is possible to provide a stator for dynamo-electric machine capable of further improving rigidity.

The invention provides a stator for dynamo-electric machine, in which the face where the inside ring core and the outside ring core are fitted to each other are joined by welding. As a result of such construction, it is possible to provide a stator for dynamo-electric machine capable of improving rigidity.

The invention provides a stator for dynamo-electric machine, in which the outside ring core is divided into parts in axial direction and portions where the parts are fitted are joined together by welding. As a result of such construction, it is possible to provide a stator for dynamo-electric machine capable of improving rigidity.

The invention provides a stator for dynamo-electric machine, in which the contact portion of the inside ring core is disposed at a position corresponding to each slot. As a result of such construction, it is possible to provide a stator for dynamo-electric machine capable of improving working efficiency.

The invention provides a stator for dynamo-electric machine, in which the contact portion of the inside ring core is disposed at the teeth. As a result of such construction, it is possible to provide a stator for dynamo-electric machine capable of improving working efficiency.

The invention provides a stator for dynamo-electric machine, in which width of the teeth where the contact portion of the inside ring core is disposed is formed larger than the rest. As a result of such construction, it is possible to provide a stator for dynamo-electric machine capable of holding the coils without decreasing rigidity.

The invention provides a stator for dynamo-electric machine, in which the plate-type magnetic members of which thickness is larger than the rest are disposed at two end portions in axial direction. As a result of such construction, it is possible to provide a stator for dynamo-electric machine capable of improving both rigidity and working efficiency.

BRIEF DESCRIPTION OF THE DRAWINGS

FIG. 15 (A) is a sectional view showing a stator core under production and FIG. 15 (B) is a sectional view showing the stator core after completing the manufacture.

FIG. 16 (A) is a sectional view showing a stator core under production and (B) is a sectional view showing a stator core after completing the manufacture.

FIG. 34 (A) is a front view showing before inserting the coils and FIG. 34 (B) is a front view after inserting the coils.

DESCRIPTION OF THE PREFERRED EMBODIMENTS

Embodiment 1

Figure 1:
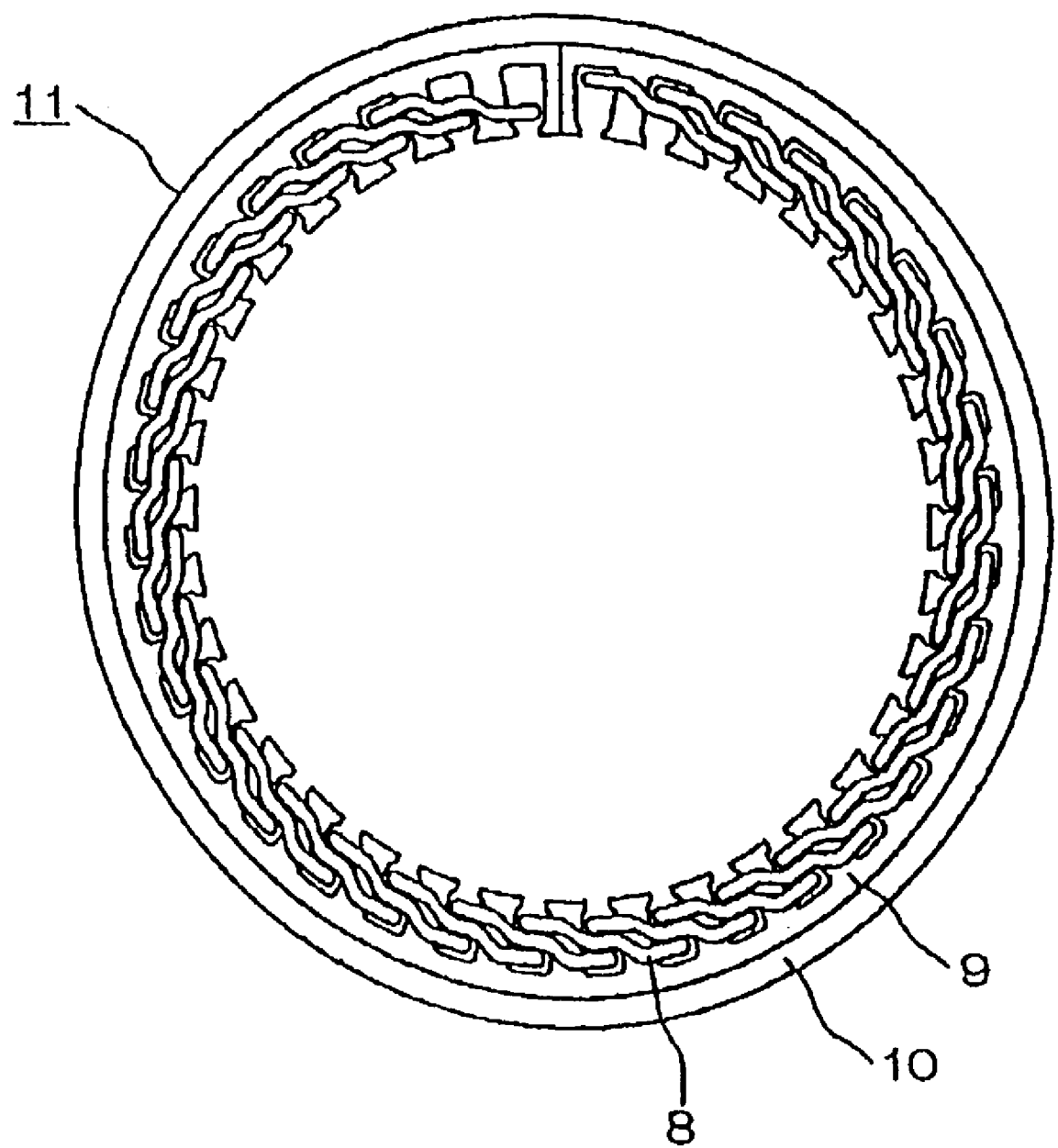
FIG. 1 is a front view showing a construction of a stator for dynamo-electric machine according to Embodiment 1 of the present invention.
Figure 2:
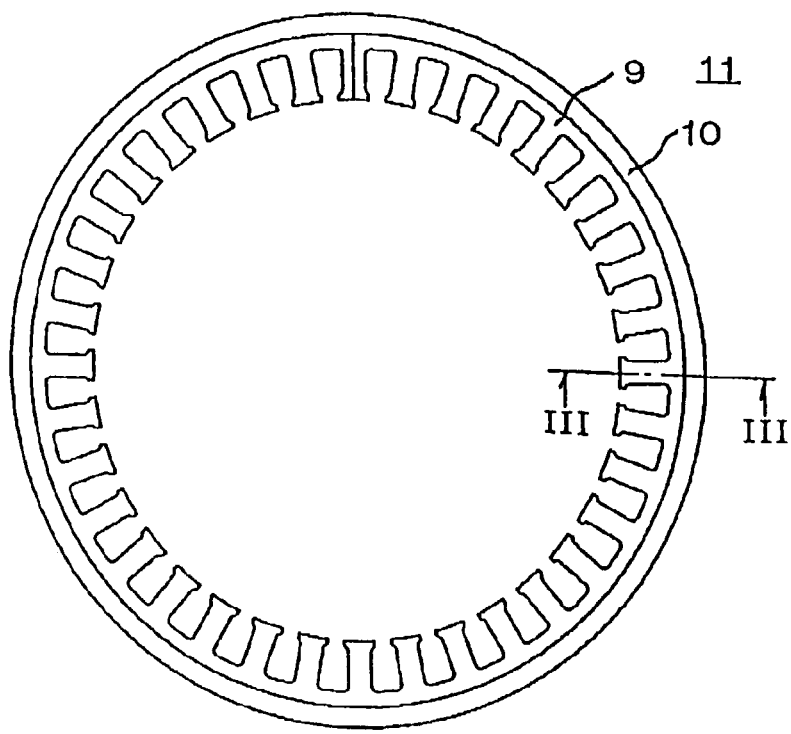
FIG. 2 is a front view showing a construction of the stator core in FIG. 1.
Figure 3:
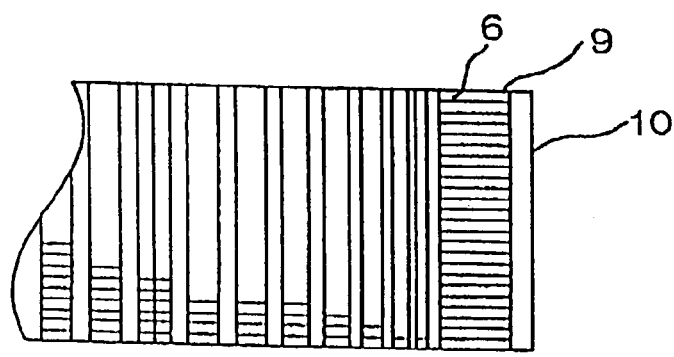
FIG. 3 is a sectional view taken along the line III—III in FIG. 2.
Figure 4:
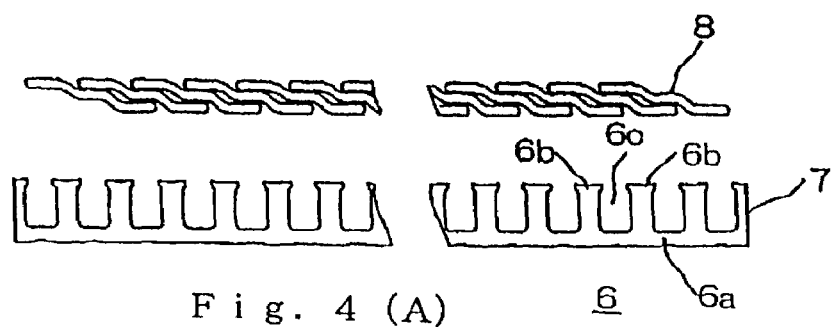
FIGS. 4 (A) and (B) show a manufacturing process of the inside ring core in FIG. 2, and FIG. 4 (A) is a front view before inserting coils and FIG. 4 (B) is a front view after inserting the coils.
Figure 4:
Figure 5:
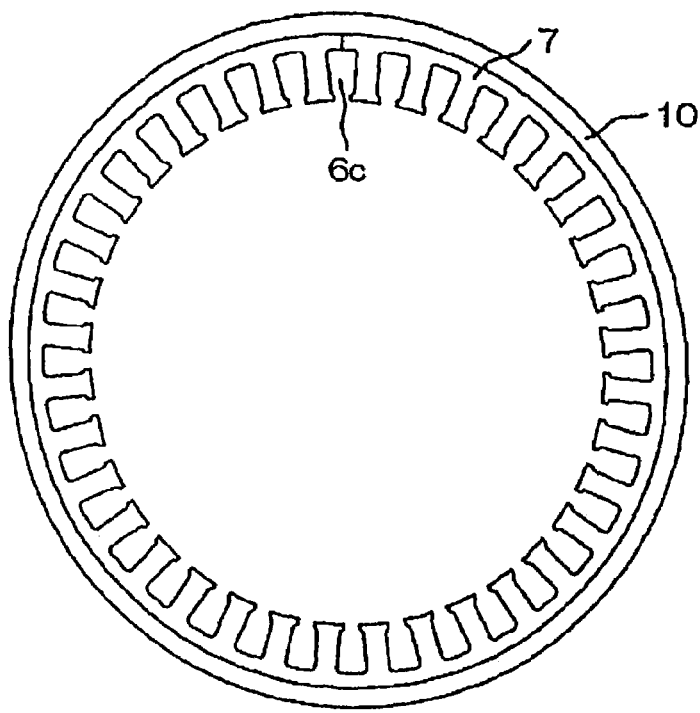
FIG. 5 is a front view showing another construction of the stator core in FIG. 1, which is different from that in FIG. 2.
Figure 6:
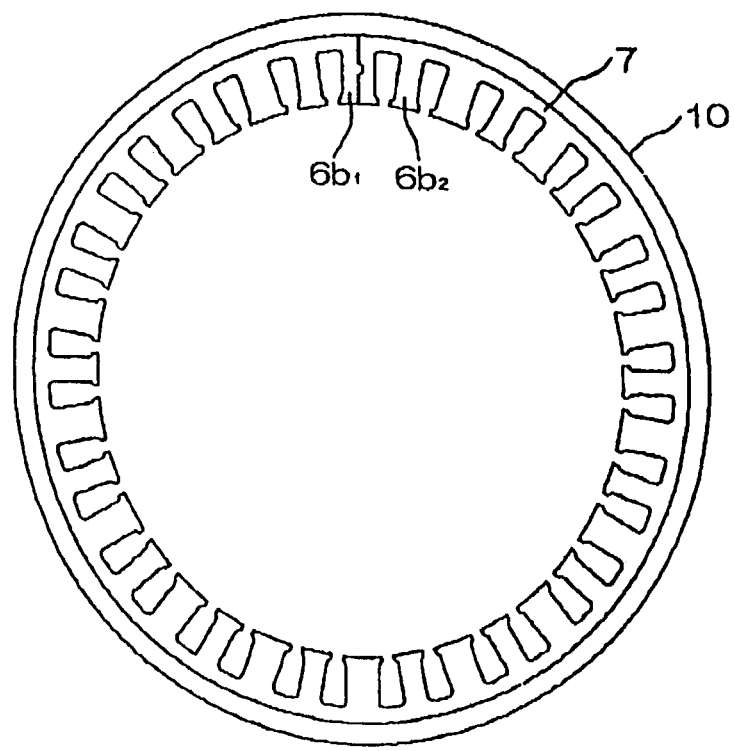
FIG. 6 is a front view showing a further construction of a stator core in FIG. 1, which is different from that in FIG. 2.
Figure 7:
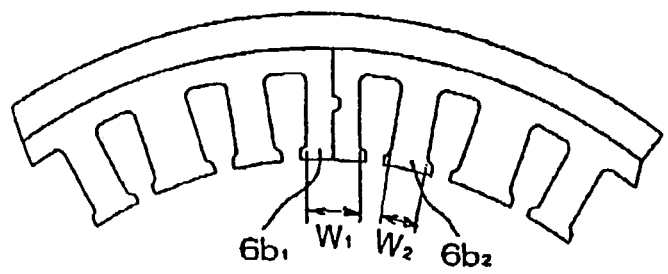
FIG. 7 is an enlarged view showing a construction of the essential parts of the stator core in FIG. 6.

The present invention is hereinafter described in more detail with reference to the accompanying drawings. FIG. 1 is a front view showing a construction of a stator for dynamo-electric machine according to Embodiment 1 of the invention. FIG. 2 is a front view showing a construction of a stator core in FIG. 1. FIG. 3 is a sectional view taken along the line III—III in FIG. 2. FIGS. 4 (A) and (B) show a manufacturing process of the inside ring core in FIG. 2, and FIG. 4 (A) is a front view before inserting coils and FIG. 4 (B) is a front view after inserting the coils. FIG. 5 is a front view showing another construction of the stator core in FIG. 1, which is different from that in FIG. 2. FIG. 6 is a front view showing a further construction of a stator core in FIG. 1, which is different from that in FIG. 2. FIG. 7 is an enlarged view showing a construction of the essential parts of the stator core in FIG. 6.

In FIGS. 1 through 4, reference numeral 6 is a plate-type magnetic members in which a plurality of teeth 6b are disposed on one side of a yoke portion 6a, and each of slots 6c is disposed between one teeth 6b and another. Two ends of the plate-type magnetic member are formed such that one of the teeth 6b is divided into two parts in direction of width. A required number of such magnetic members are laminated and integrated together to form a rectangular parallelepiped-shaped laminated body 7. Numeral 8 is coils inserted and disposed into respective slots 6c. Numeral 9 is an inside ring core formed by annularly bending the laminated body 7 with coils 8 disposed therein and bringing both end faces into contact with each other. Numeral 10 is a outside ring core, being made of magnetic members and formed cylindrical in shape, which is fitted on outside of the inside ring 9 and forms a stator core together with the inside ring core 9.

A manufacturing process of the stator for dynamo-electric machine of above construction according to Embodiment 1 is hereinafter described.

First, a required number of plate-type magnetic members 6, each of which has a plurality of teeth 6b on one side of a yoke portion 6a, are formed by punching. The plate-type magnetic members 6 are laminated and integrated together by caulking or the like to form the rectangular parallelepiped-shaped laminated body 7. Then, after inserting the coils 8 into the slots and disposing of the laminated body 7 in respective slots 6c, the laminated body 7 is bent annularly by a molding machine (not shown), with its coil disposition side inward, so that two ends thereof comes in contact with each other to form an annular shape. Subsequently, the two end portions are joined each other by welding or the like to form the inside ring core 9. Finally, the outside ring core 10 is fitted on the outside of the inside ring core 9 to hold the inside ring core 9, thereby forming the stator core 11. In this manner, a stator for dynamo-electric machine is manufactured.

In this Embodiment 1, the stator core 11 is comprised of the inside ring core 9 and the outside ring core 10, and a magnetic path is shared by the yoke portion 6a of the inside ring core 9 and the outside ring core 10. Accordingly, thickness of the yoke portion 6a can be reduced by just as much as the share of the outside ring core 10. Therefore, a small amount of power is enough to bend annularly the inside ring core 9 and it is possible to prevent distortion of the laminated body 7 resulting in decrease of magnetic performance. As a result, it is also possible to prevent deterioration of efficiency. Further, because the inside ring core 9 is held from outside by fitting the cylindrical outside ring core 10, a perfect annular construction can be obtained easily. Furthermore, because rigidity of the stator core 11 itself can be improved, it is possible to restrain generation of electromagnetic noises.

In the construction described above, because end faces, i.e., contact portion of the laminated body 7 is disposed at the position corresponding to each of the teeth 6b, any of slots 6*c* is not negatively affected and the coils 8 are fully held. Therefore, in the process of bending the laminated body 7 and joining the end faces thereof together, the coils 8 does not come apart, thus, an easier work is assured. Furthermore, as shown in FIG. 5, the end faces of the laminated body 7 can be disposed at the position corresponding to each of the slots 6*c*, whereby the contact area in the joining step becomes small, which allows easy positioning. Further, as shown in FIG. 6 and FIG. 7, the teeth 6*b*1, where the end faces, i.e., the contact portions of the laminated body 7 are disposed, can be formed to have a larger width W1 as compared with a width W2 of the other teeth 6*b*2. It is also possible to dispose alternately the teeth 6*b*1 having the width W1 and the teeth 6*b*2 of smaller width. In this manner, the teeth, even if they are divided into two, can hold the coils under satisfactory control without decreasing rigidity thereof.

Embodiment 2

Figure 8:
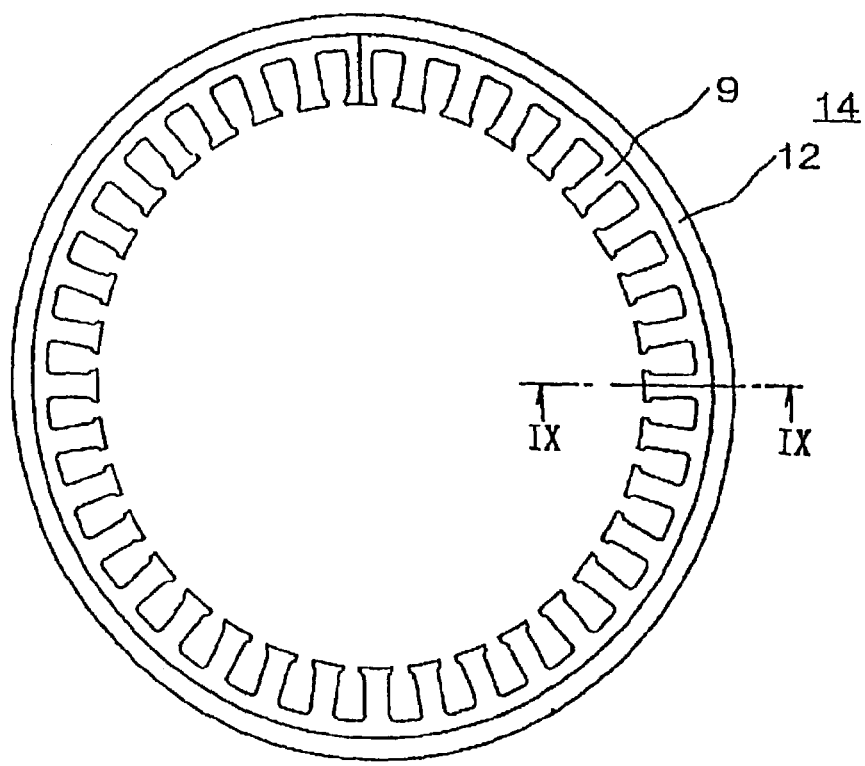
FIG. 8 is a front view showing a construction of a stator core of the stator for dynamo-electric machine according to Embodiment 2 of the invention.
Figure 9:
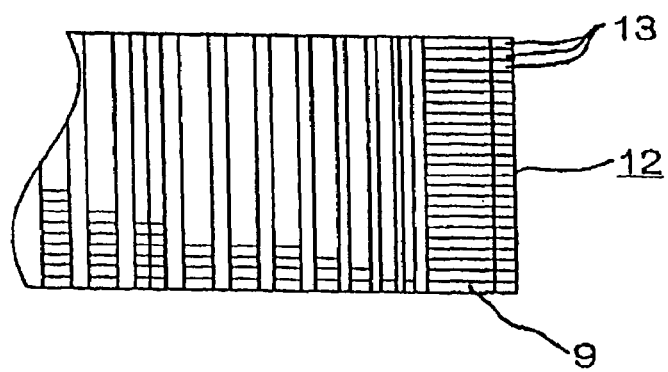
FIG. 9 is a sectional view taken along the line IX—IX in FIG. 8.
Figure 10:
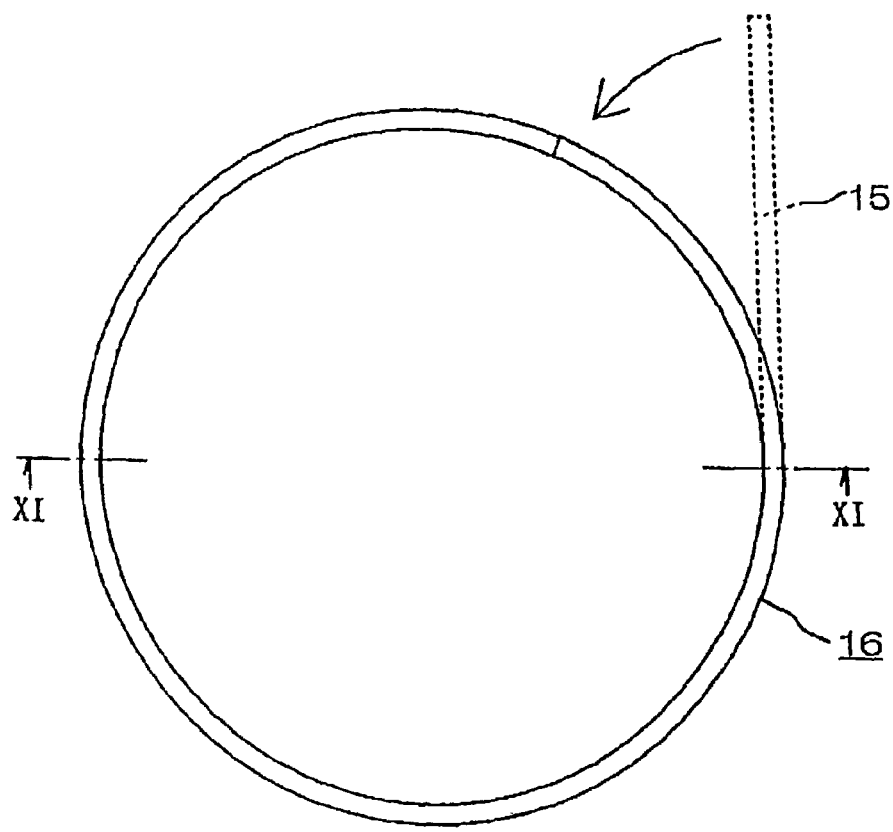
FIG. 10 is a front view showing another construction of a stator core of the stator for dynamo-electric machine, which is different from that in FIG. 8, according to Embodiment 2 of the invention.
Figure 11:
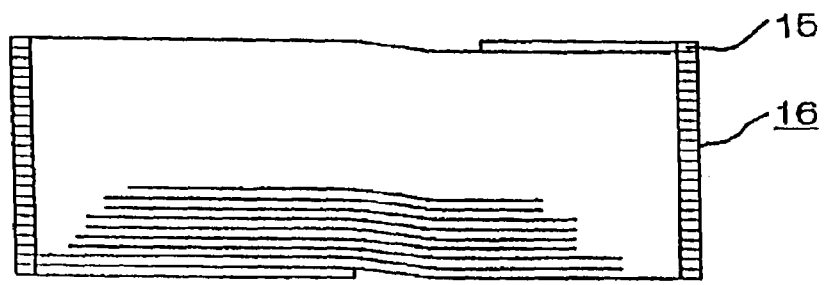
FIG. 11 is a sectional view taken along the line XI—XI in FIG. 10.

FIG. 8 is a front view showing a construction of a stator core of the stator for dynamo-electric machine according to Embodiment 2 of the invention. FIG. 9 is a sectional view taken along the line IX—IX in FIG. 8. FIG. 10 is a front view showing another construction of a stator core of the stator for dynamo-electric machine, which is different from that in FIG. 8, according to Embodiment 2 of the invention. FIG. 11 is a sectional view taken along the line XI—XI in FIG. 10.

In FIGS. 8 and 9, the same reference numerals are designated to the same or like parts as those described in the foregoing Embodiment 1, and further description thereof is omitted herein.

Numeral 12 is an outside ring core, which is cylindrical in shape and fitted on the outside of the inside ring core 9 on which coils (not shown) are disposed. The outside ring core 12 is formed by laminating and integrating fixedly a required number of annular plate-type magnetic members 13 in one piece to form a stator core 14 together with the inside ring core 9.

In this Embodiment 2, because the stator core 14 is formed by fitting the outside ring core 12 on the outside of the inside ring core 9, it is possible to prevent deterioration of efficiency and obtain a perfect annular construction easily, in the same manner as in the foregoing Embodiment 1. It is also possible to restrain the occurrence of electromagnetic noises. Furthermore, because the outside ring core 12 is formed into the laminated construction, it is possible to improve magnetic performance and further prevent deterioration of efficiency.

In the construction discussed above, the outside ring core 12 is formed into a laminated construction by laminating a required number of annular plate-type magnetic members 13. It is also preferable to form an outside ring core 16 into a cylindrical laminated construction by winding an elongated plate-type magnetic member 15 spirally, as shown in FIGS. 10 and 11, so that the outside ring core 16 is fitted on the outside of the inside ring (not shown in the drawings) to form a stator core. In such a modified construction, it is possible to improve magnetic performance and prevent deterioration efficiency, in the same manner as that in FIGS. 8 and 9. Furthermore, in such a modified construction, because the punching step can be omitted, the entire manufacturing process becomes more simple and easy.

Embodiment 3

Figure 12:
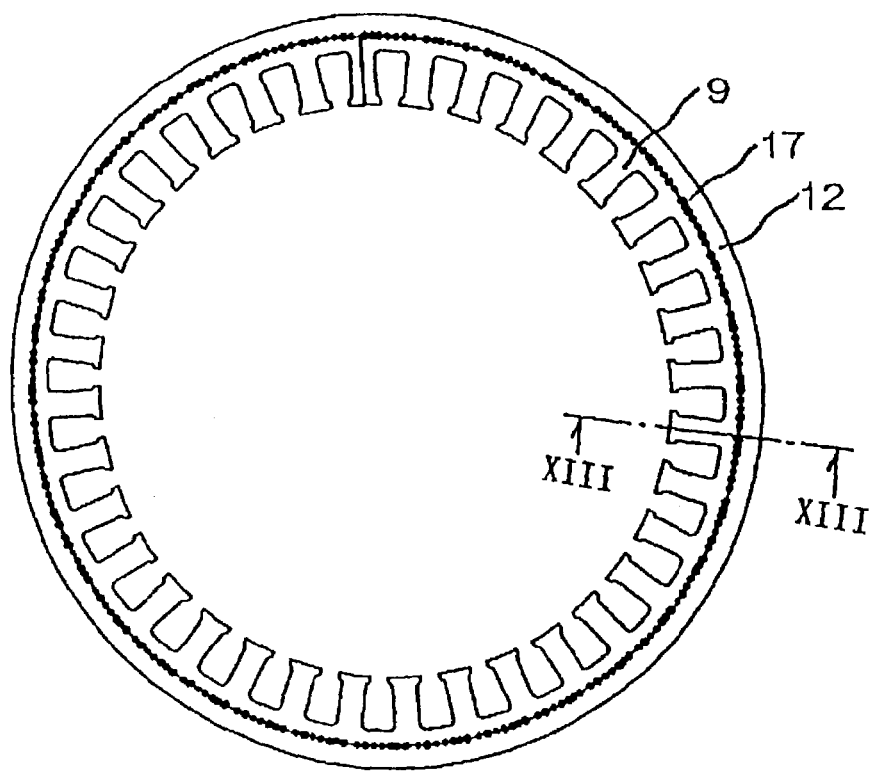
FIG. 12 is a front view showing a construction of a stator core of the stator for dynamo-electric machine according to Embodiment 3 of the invention.
Figure 13:
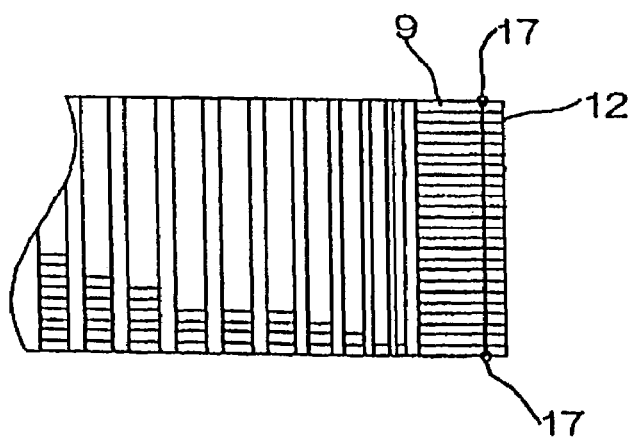
FIG. 13 is a sectional view taken along the line XIII—XIII in FIG. 12.
Figure 14:
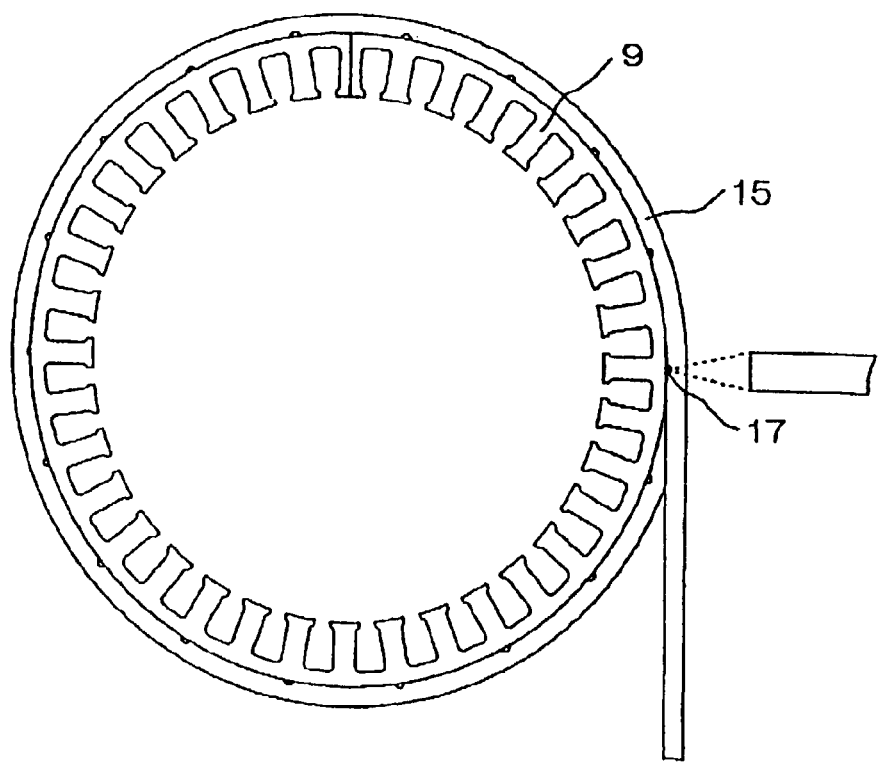
FIG. 14 is a front view showing a manufacturing process of the stator core of the stator for dynamo-electric machine, which is a different construction from that in FIG. 12, according to Embodiment 3 of the invention.
Figure 15:
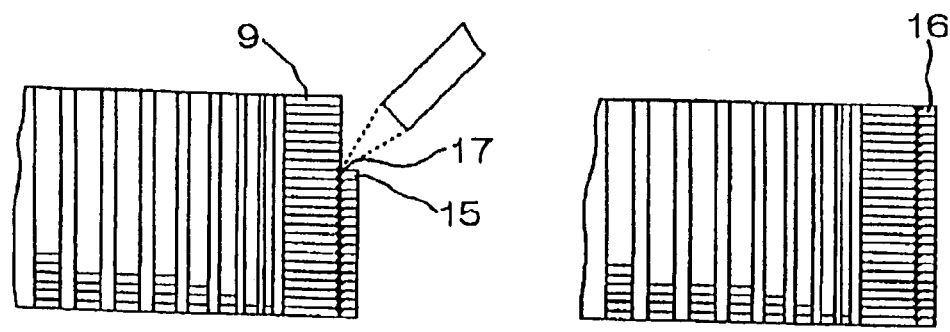
FIGS. 15 (A) and (B) show a manufacturing process of a stator core in FIG. 14.
Figure 16:
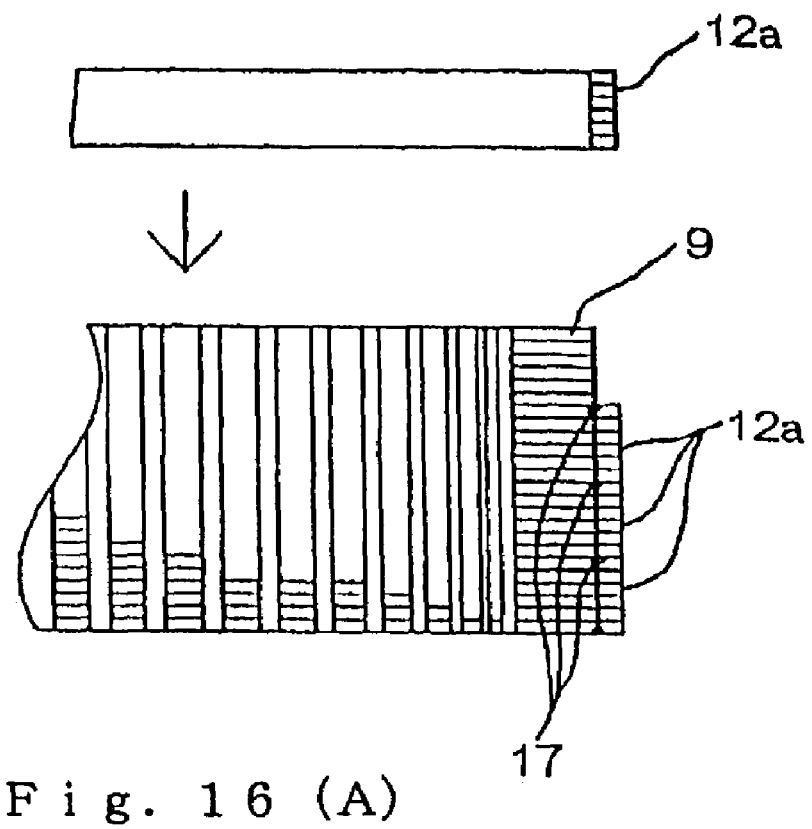
FIGS. 16 (A) and (B) show a further manufacturing process of the stator core of the stator for dynamo-electric machine, which is a different construction from that FIG. 12, according to Embodiment 3 of the invention.
Figure 16:
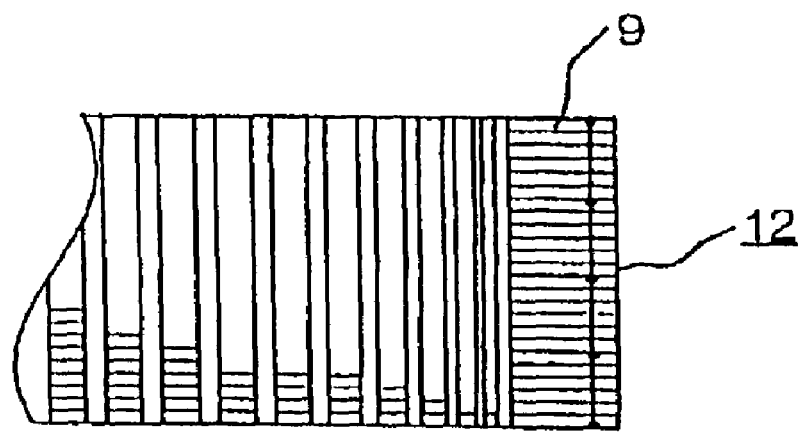

FIG. 12 is a front view showing a construction of a stator core of the stator for dynamo-electric machine according to Embodiment 3 of the invention. FIG. 13 is a sectional view taken along the line XIII—XIII in FIG. 12. FIG. 14 is a front view showing a manufacturing process of the stator core of the stator for dynamo-electric machine, which is a different construction from that in FIG. 12, according to Embodiment 3 of the invention. FIGS. 15 (A) and (B) show a manufacturing process of a stator core in FIG. 14. FIG. 15 (A) is a sectional view showing a stator core under production and FIG. 15 (B) is a sectional view showing the stator core after completing the manufacture. FIGS. 16 (A) and (B) show a further manufacturing process of the stator core of the stator for dynamo-electric machine, which is a different construction from that FIG. 12, according to Embodiment 3 of the invention. FIG. 16 (A) is a sectional view showing a stator core under production and (B) is a sectional view showing a stator core after completing the manufacture.

In FIGS. 12 and 13, the same reference numerals are designated to the same or like parts as those described in the foregoing Embodiment 1, and further description thereof is omitted herein. Numeral 17 is a welding for joining together the inside ring core 9 with coils (not shown) disposed therein and the fitting portion of the outside ring core 12 to be fitted on the outside of the inside ring core 9, and integrating fixedly those ring cores in one unit.

In this Embodiment 3, because the inside ring core 9 and the fitting portion of the outside ring core 12 are joined by welding, the inside ring core 9 and the outside ring core 12 can be fixedly integrated in one unit without fail, and it is possible to improve rigidity.

The above description has been made with respect to the construction shown in FIGS. 8 and 9 in the foregoing Embodiment 2. However, as shown in FIGS. 14 and 15, it is also preferable to form the outside ring core 16 with respect to the construction shown in FIGS. 10 and 11 in the following manner. That is, the outside ring core 16 is formed by applying, sequentially in order, the welding 17 to predetermined circumferential positions of the fitting portion between the inside ring core 9 and the plate-type magnetic member 15 while winding spirally the elongated plate-type magnetic member 15 on the outside of the inside ring core 9. In such a modified construction, it is possible to achieve the same advantages as in the foregoing construction.

Furthermore, it is also preferable that the outside ring core 12 shown in FIGS. 12 and 13 is divided into four portions as shown in FIG. 16. Each of the divided outside ring core 12*a* is fitted on the outside of the inside ring core 9 sequentially in order as indicated by the arrow in the drawings, and then the respective fitted portions are fixedly joined by the welding 17. In such a modified construction, it is possible to achieve further improvement of rigidity as compared with the construction in FIG. 12 and 13.

Embodiment 4

Figure 17:
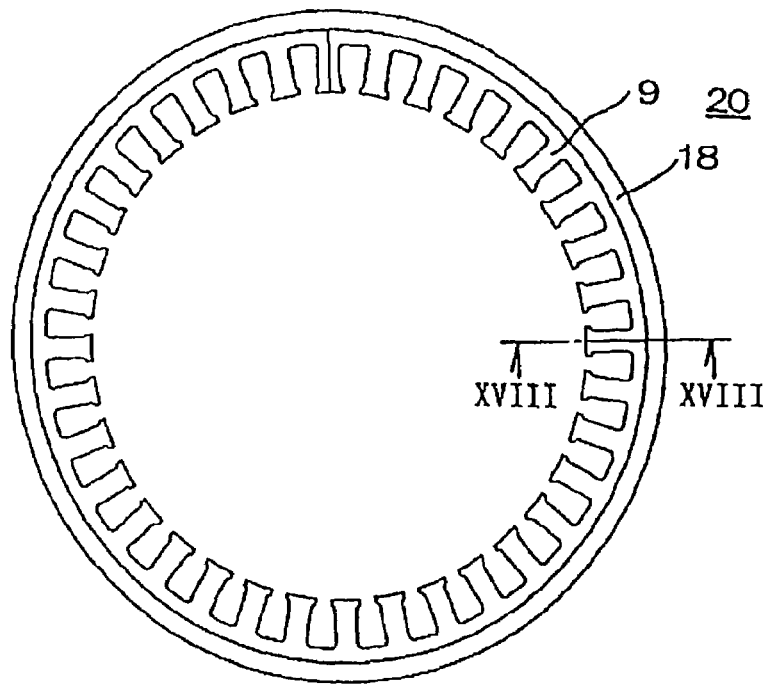
FIG. 17 is a front view showing a construction of a stator core of a stator for dynamo-electric machine according to Embodiment 4 of the invention.
Figure 18:
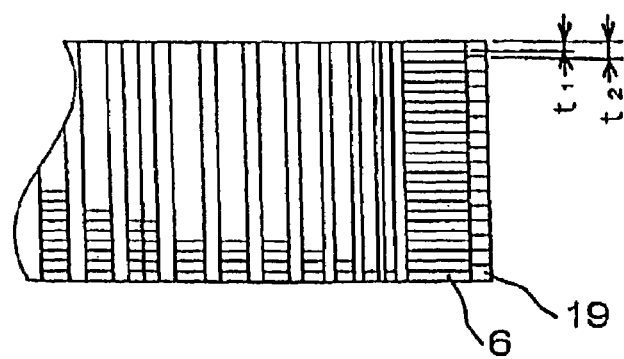
FIG. 18 is a sectional view taken along the line XVIII—XVIII in FIG. 17.
Figure 19:
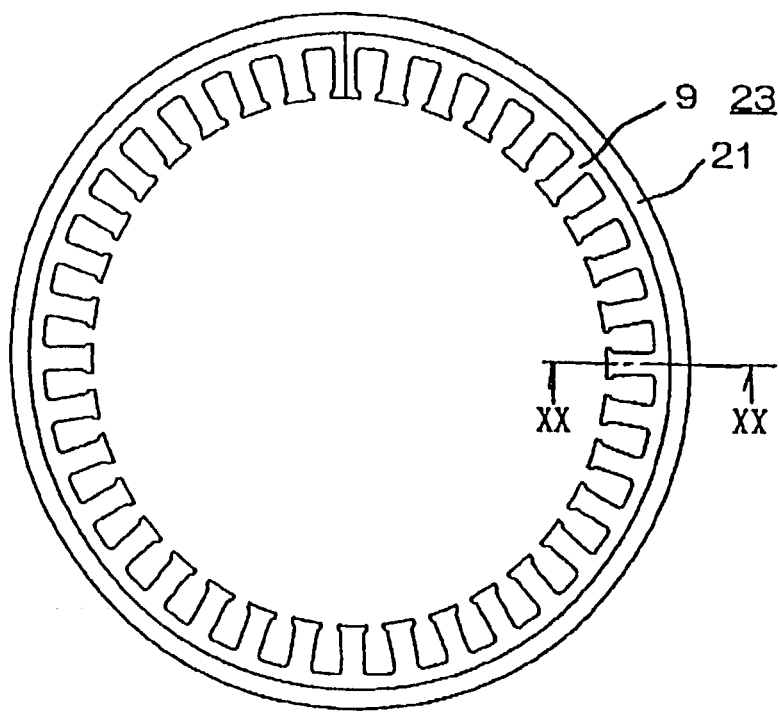
FIG. 19 is a front view showing another construction, which is different from that in FIG. 17, of the stator core of the stator for dynamo-electric machine according to Embodiment 4 of the invention.
Figure 20:
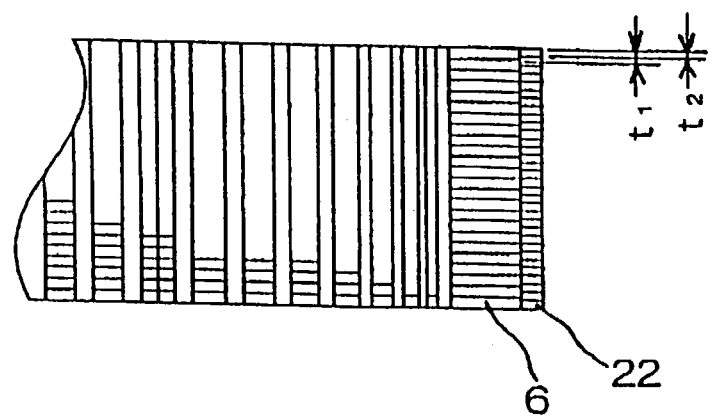
FIG. 20 is a sectional view taken along the line XX—XX in FIG. 19.

FIG. 17 is a front view showing a construction of a stator core of a stator for dynamo-electric machine according to Embodiment 4 of the invention. FIG. 18 is a sectional view taken along the line XVIII—XVIII in FIG. 17. FIG. 19 is a front view showing another construction, which is different from that in FIG. 17, of the stator core of the stator for dynamo-electric machine according to Embodiment 4 of the invention. FIG. 20 is a sectional view taken along the line XX—XX in FIG. 19.

In the drawings, the same reference numerals are designated to the same or like parts as those described in the foregoing Embodiment 2, and further description thereof is omitted herein.

As shown in FIGS. 17 and 18, reference numeral 18 is a cylindrical outside ring core fitted on the outside of the inside ring core 9 on which coils (not shown) are disposed. The outside ring core 18 is formed by laminating and fixedly integrating in one piece a required number of annular plate-type magnetic members 19, each having a thickness t2 larger than a thickness t1 of each magnetic member 6 forming the inside ring core 9. Thus, a stator coil 20 is formed of the mentioned outside ring core 18 together with the inside ring core 9.

Further, as shown in the FIGS. 19 and 20, numeral 21 is another cylindrical outside ring core fitted on the outside of the inside ring core 9 on which coils (not shown) are disposed. The outside ring core 21 is formed by laminating and fixedly integrating in one piece a required number of annular plate-type magnetic members 19, each having a thickness t2 smaller than a thickness t1 of each magnetic member 6 forming the inside ring core 9. Thus, the mentioned outside ring core 18 forms a stator coil 20 together with the inside ring core 9.

In this Embodiment 4, as shown in FIGS. 17 and 18, because the outside ring core 18 is formed by laminating the plate-type magnetic members 19, each having a thickness t2 larger than a thickness t1 of each plate-type magnetic member 6 forming the inside ring core 9, it is possible to improve rigidity of the stator core 20.

Furthermore, as shown in FIGS. 19 and 20, because the outside ring core 21 is formed by laminating the plate-type magnetic members 22, each having a thickness t2 smaller than a thickness t1 of each plate-type magnetic member 6 forming the inside ring core 9, it is possible to improve magnetic performance in the stator core 23 and prevent deterioration of efficiency.

Embodiment 5

Figure 21:
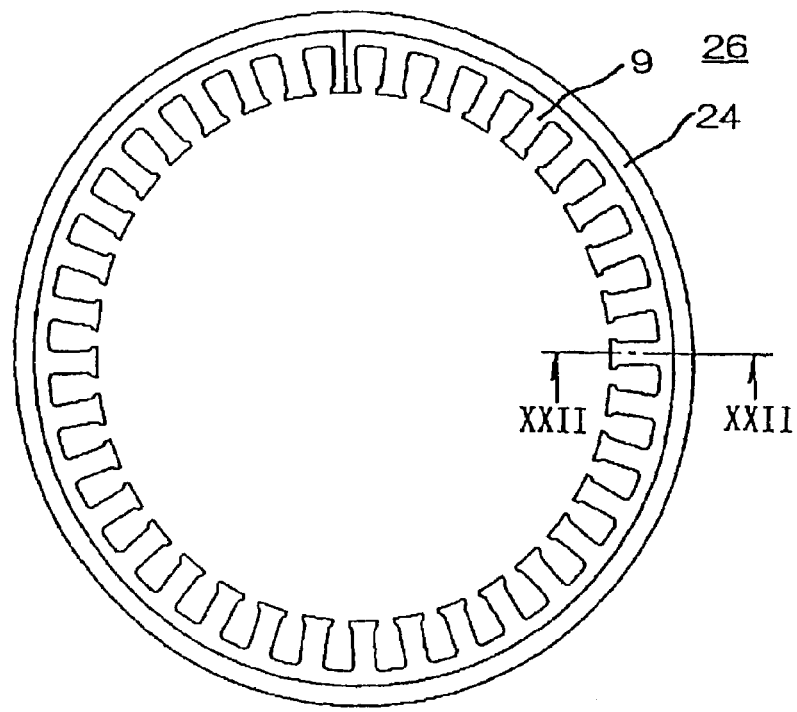
FIG. 21 is a front view showing a construction of a stator core of a stator for dynamo-electric machine according to Embodiment 5 of the invention.
Figure 22:
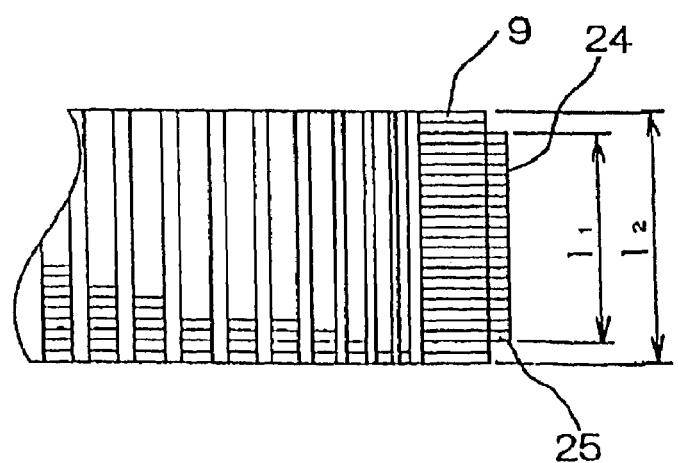
FIG. 22 is a sectional view taken along the line XXII—XXII in FIG. 21.

FIG. 21 is a front view showing a construction of a stator core of a stator for dynamo-electric machine according to Embodiment 5 of the invention. FIG. 22 is a sectional view taken along the line XXII—XXII in FIG. 21.

In the drawings, the same reference numerals are designated to the same or like parts as those described in the foregoing Embodiment 2, and further description thereof is omitted herein. Numeral 24 is a cylindrical outside ring core, fitted on the outside of the inside ring core 9 on which coils (not shown) are disposed. The outside ring core 24 is formed by laminating and integrating fixedly in one piece a required number of plate-type magnetic members 25 in such a manner that its length l1 in axial direction is shorter than the length l2 in axial direction of the inside ring core 9. The outside ring core 24 is fitted to the central part of the inside ring core 9. Thus, the mentioned outside ring core 24 forms a stator coil 26 together with the inside ring core 9.

In this Embodiment 5, because the outside ring core 24 is formed so that its length l1 in axial direction is smaller than the length l2 in axial direction of the inside ring core 9 and is fitted to the central part of the inside ring core 9, it is possible to expose the outside perimeter portions of both ends of the inside ring core 9. The exposed portions can be held by a bracket (not shown), which results in easy construction of the dynamo-electric machine.

Embodiment 6

Figure 23:
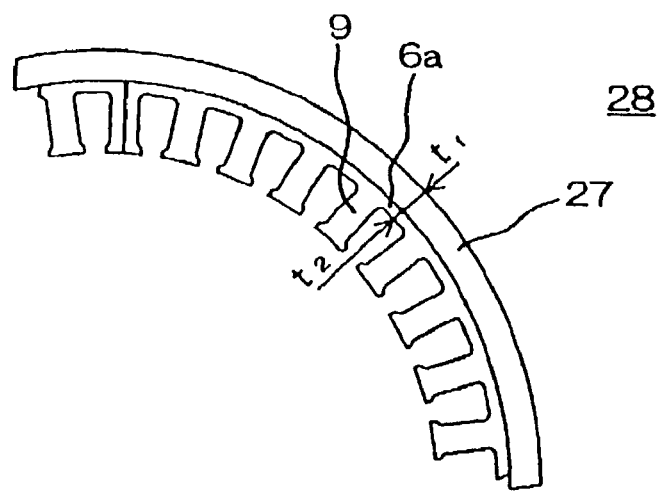
FIG. 23 is a partially enlarged view showing a construction of the essential parts of a stator core of a stator for dynamo-electric machine according to Embodiment 6 of the invention.
Figure 24:
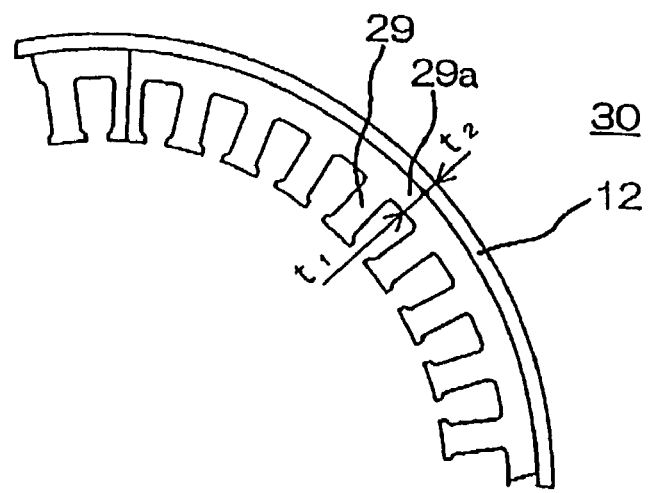
FIG. 24 is a partially enlarged view showing a construction, which is different from that in FIG. 23, of the essential parts of the stator core of the stator for dynamo-electric machine according to Embodiment 6 of the invention.

FIG. 23 is a partially enlarged view showing a construction of the essential parts of a stator core of a stator for dynamo-electric machine according to Embodiment 6 of the invention. FIG. 24 is a partially enlarged view showing a construction, which is different from that in FIG. 23, of the essential parts of the stator core of the stator for dynamo-electric machine according to Embodiment 6 of the invention.

In the drawings, the same reference numerals are designated to the same or like parts as those described in the foregoing Embodiment 2, and further description thereof is omitted herein.

As shown in FIG. 23, numeral 27 is a cylindrical outside ring core which is fitted on the outside of the inside ring core 9 on which coils (not shown) are disposed. The outside ring core 27 has a thickness t1 in radial direction which is larger than a thickness t2 in radial direction of the yoke portion 6a of the inside ring core 9. The outside ring core 27 forms a stator core 28 together with the inside ring core 9.

Further, as shown in FIG. 24, numeral 29 is an inside ring core on which coils (not shown) are disposed, and in which thickness t1 of a yoke portion 29a in radial direction is larger than thickness t2 in radial direction of an outside ring core 12, which is cylindrical and fitted on the outside of the inside ring core 29. The inside ring core 29 forms a stator core 30 together with the outside ring core 12.

In this Embodiment 6, as shown in FIG. 23, because the thickness t1 in radial direction of the outside ring core 27 is formed to be larger than the thickness t2 of the yoke portion 6a in radial direction of the inside ring core 9, it is possible to improve rigidity of the stator core 28.

Furthermore, as shown in FIG. 24, because the thickness t1 of the yoke portion 29a in radial direction of the inside ring core 29 is formed to be larger than the thickness t2 in radial direction of the outside ring core 12, it is possible to increase main magnetic path, and improve magnetic performance. As a result, it is possible to prevent deterioration of efficiency.

Embodiment 7

Figure 25:
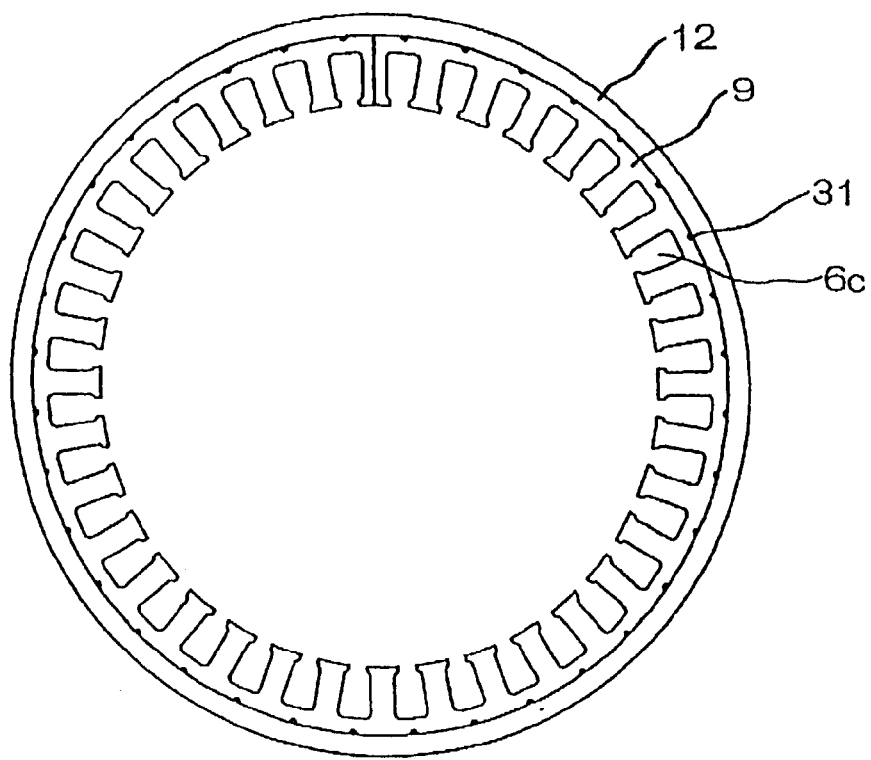
FIG. 25 is a front view showing a construction of a stator core of a stator for dynamo-electric machine according to Embodiment 7 of the invention.
Figure 26:
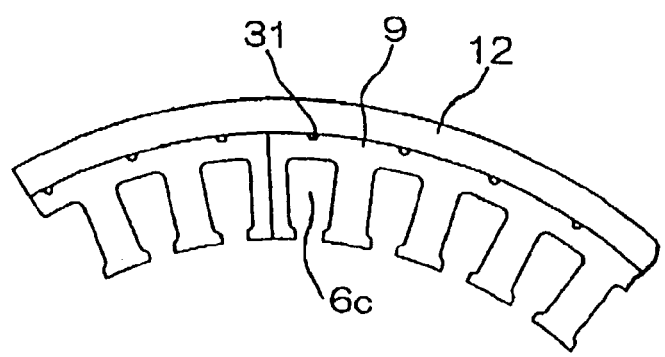
FIG. 26 is a partially enlarged view showing a construction of the essential parts of the stator core in FIG. 25.
Figure 27:
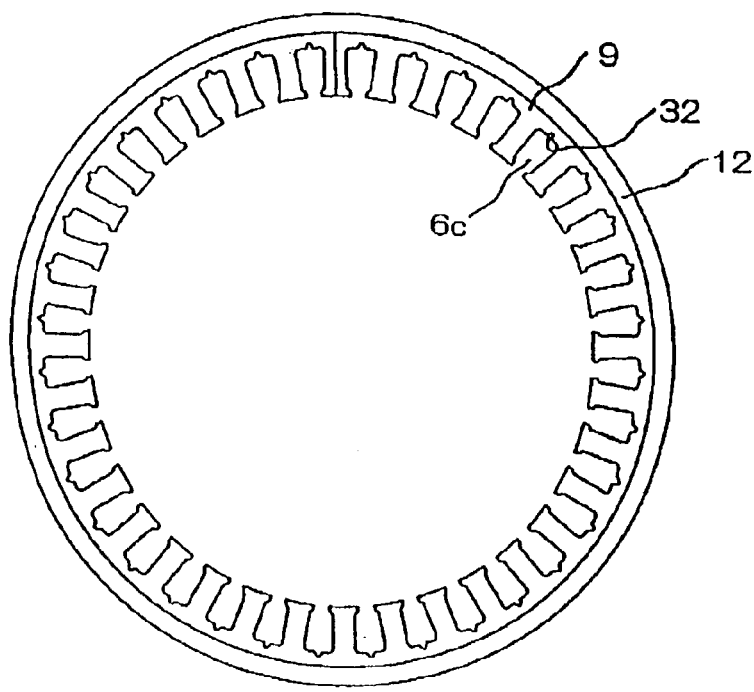
FIG. 27 is a front view showing a construction, which is different from that in FIG. 25, of the stator core of the stator for dynamo-electric machine according to Embodiment 7 of the invention.

FIG. 25 is a front view showing a construction of a stator core of a stator for dynamo-electric machine according to Embodiment 7 of the invention. FIG. 26 is a partially enlarged view showing a construction of the essential parts of the stator core in FIG. 25. FIG. 27 is a front view showing a construction, which is different from that in FIG. 25, of the stator core of the stator for dynamo-electric machine according to Embodiment 7 of the invention.

In the drawings, the same reference numerals are designated to the same or like parts as those described in the foregoing Embodiment 2, and further description thereof is omitted herein.

As shown in FIGS. 25 and 26, numeral 31 is concave portions formed extending in axial direction at the positions each corresponding to the substantially central part of the bottom portion of each slot 6c on the outside perimeter of the inside ring core 9.

As shown in FIG. 27, numeral 32 is concave portions formed extending in axial direction at the central part of the bottom portion of each slot 6c of the inside ring core 9.

In this Embodiment 7, as shown in FIGS. 25 and 26, because the concave portions 31 are formed extending in axial direction at each spot corresponding to the central part of the bottom portion of each slot 6c on the outside perimeter of an inside ring core 9, the process of bending annularly a rectangular parallelepiped-shaped laminated body (not shown) becomes easier, and it becomes possible to improve working efficiency.

Furthermore, as shown in FIG. 27, because the concave portions are formed extending in axial direction at the central part of the bottom portion of each slot 6c on the inside ring core 9, the process of bending annularly a rectangular parallelepiped-shaped laminated body (not shown) becomes easier and it becomes possible to improve working efficiency in the same manner as in FIGS. 25 and 26. Moreover, because the concave portions 32 are formed outside the magnetic path magnetic performance can be improved, and it is possible to prevent deterioration of efficiency.

Embodiment 8

Figure 28:
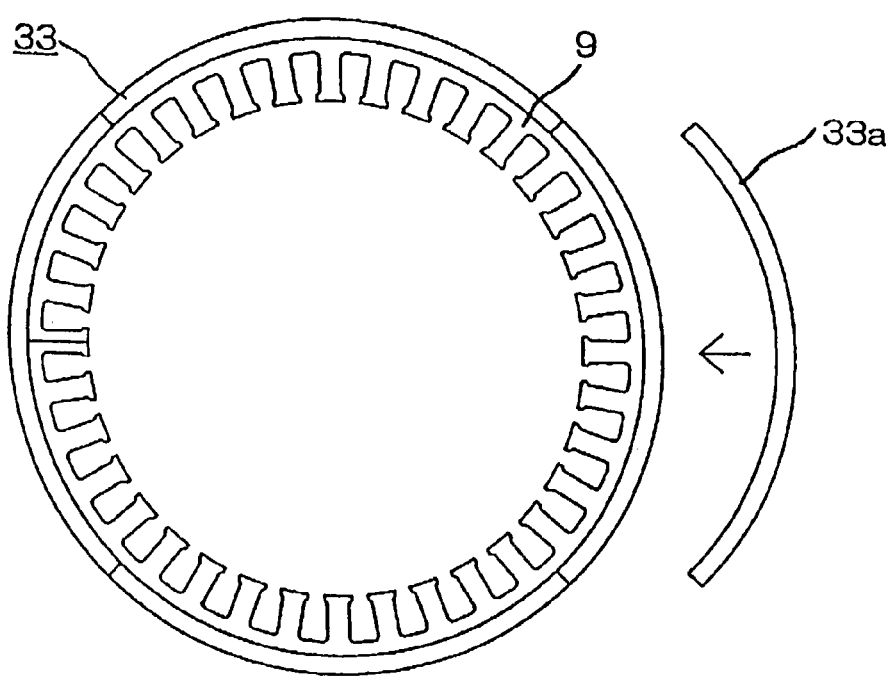
FIG. 28 is a front view showing a construction of a stator core of a stator for dynamo-electric machine according to Embodiment 8 of the invention.

FIG. 28 is a front view showing a construction of a stator core of a stator for dynamo-electric machine according to Embodiment 8 of the invention.

In the drawings, the same reference numerals are designated to the same or like parts as those described in the foregoing Embodiment 2, and further description thereof is omitted herein.

Numeral 33 is a cylindrical outside ring core fitted on the outside of the inside ring core 9. The outside ring core 33 is formed by integrating a plurality of arc-shaped magnetic members 33a in one piece.

In this Embodiment 8, because the outside ring core 33 is formed by integrating a plurality of arc-shaped magnetic members 33a in one piece, such divided magnetic members makes the manufacturing process more simple and easier when any accessory such as cooling fins is integrally formed on the outside perimeter of the outside ring core 33. As a result, it is possible to improve working efficiency and yielding percentage of materials.

Embodiment 9

Figure 29:
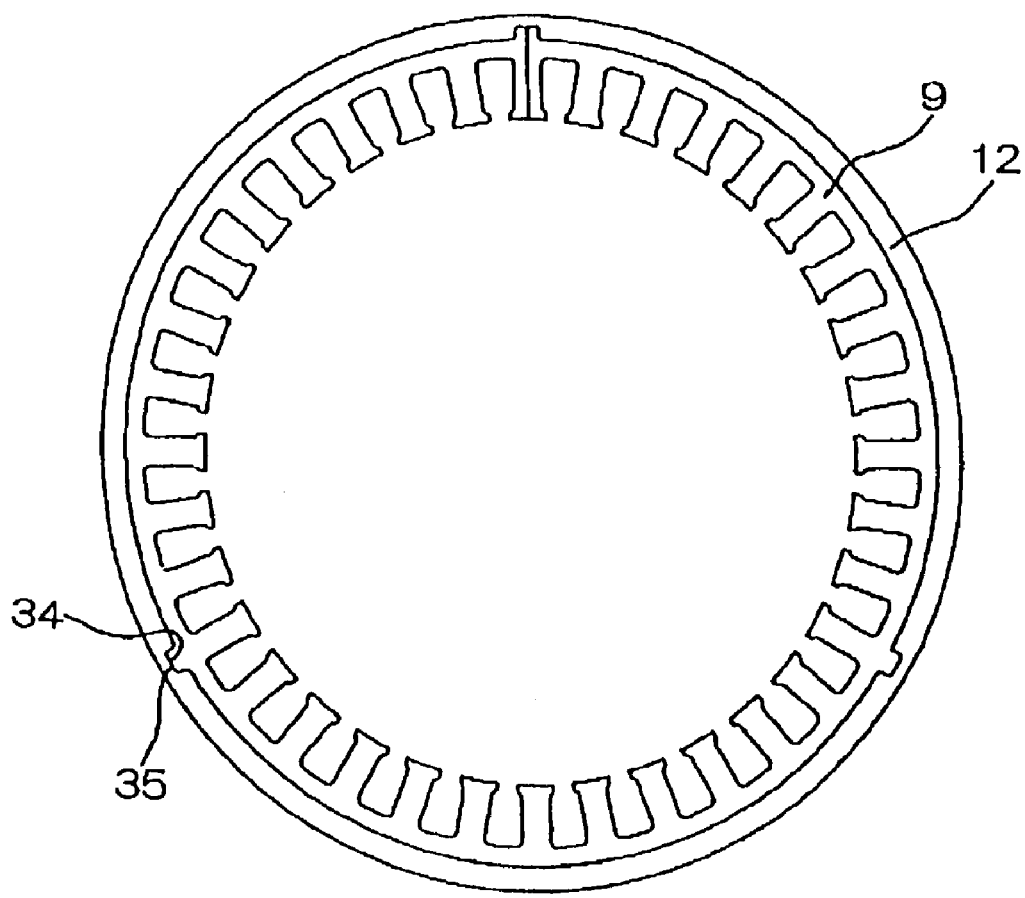
FIG. 29 is a front view showing a construction of a stator core of a stator for dynamo-electric machine according to Embodiment 9 of the invention.
Figure 30:
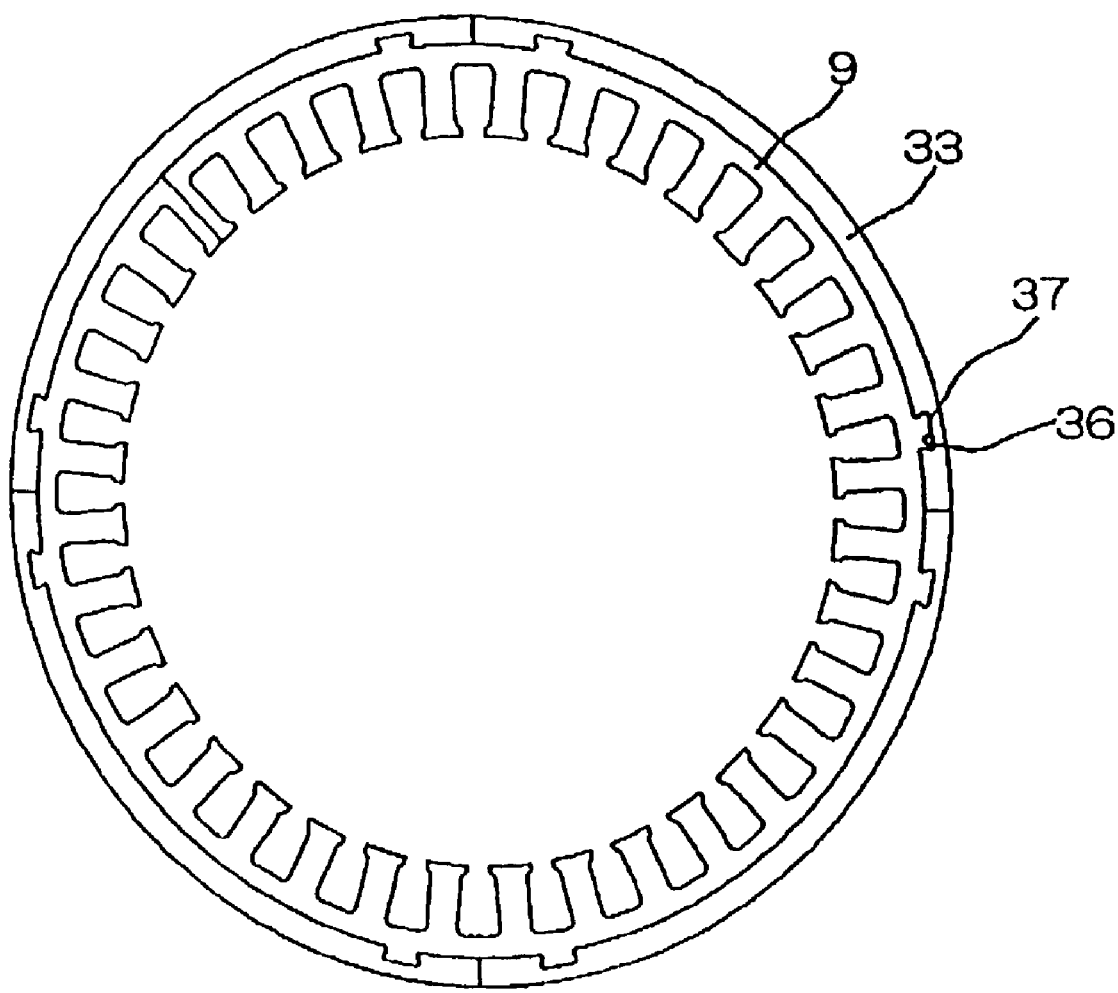
FIG. 30 is a front view showing a construction, which is different from that in FIG. 29, of the stator core of the stator for dynamo-electric machine according to Embodiment 9 of the invention.

FIG. 29 is a front view showing a construction of a stator core of a stator for dynamo-electric machine according to Embodiment 9 of the invention. FIG. 30 is a front view showing a construction, which is different from that in FIG. 29, of the stator core of the stator for dynamo-electric machine according to Embodiment 9 of the invention.

In the drawings, the same reference numerals are designated to the same or like parts as those described in the foregoing Embodiment 2, and further description thereof is omitted herein.

As shown in FIG. 29, numeral 34 and numeral 35 are concave and convex portions respectively formed to be capable of being engaged with the inside perimeter of the outside ring core 12 and the outside perimeter of the inside ring core 9. The concave portion 34 and convex portion 35 are disposed at a plurality of positions on the circumference with predetermined intervals.

As shown in FIG. 30, numeral 36 and numeral 37 are dovetailed concave and convex portions respectively formed to be capable of being engaged with the inside perimeter of the outside ring core 12 and the outside perimeter of the inside ring core 9. The dovetailed concave portion 36 and convex portion 37 are disposed at a plurality of positions on the circumference with predetermined intervals.

In this Embodiment 9, because the concave portion 34 and convex portion 35 are respectively formed to be capable of being engaged with the inside perimeter of the outside ring core 12 and the outside perimeter of the inside ring core 9, as shown in FIG. 29, it becomes possible to prevent displacement of both cores 9 and 12 in circumferential direction and improve rigidity.

Furthermore, as shown in FIG. 30, because the dovetailed convex portion 36 and concave portion 37 are respectively formed to be capable of being engaged with the inside perimeter of the outside ring core 12 and the outside perimeter of the inside ring core 9, it is not only possible to prevent displacement of both cores 9 and 33 in the same manner as in FIG. 29, but also possible to prevent formation of air gap between both cores 9 and 33 by restricting a movement in radial direction. As a result, it is possible to improve rigidity and prevent deterioration of magnetic performance.

Embodiment 10

Figure 31:
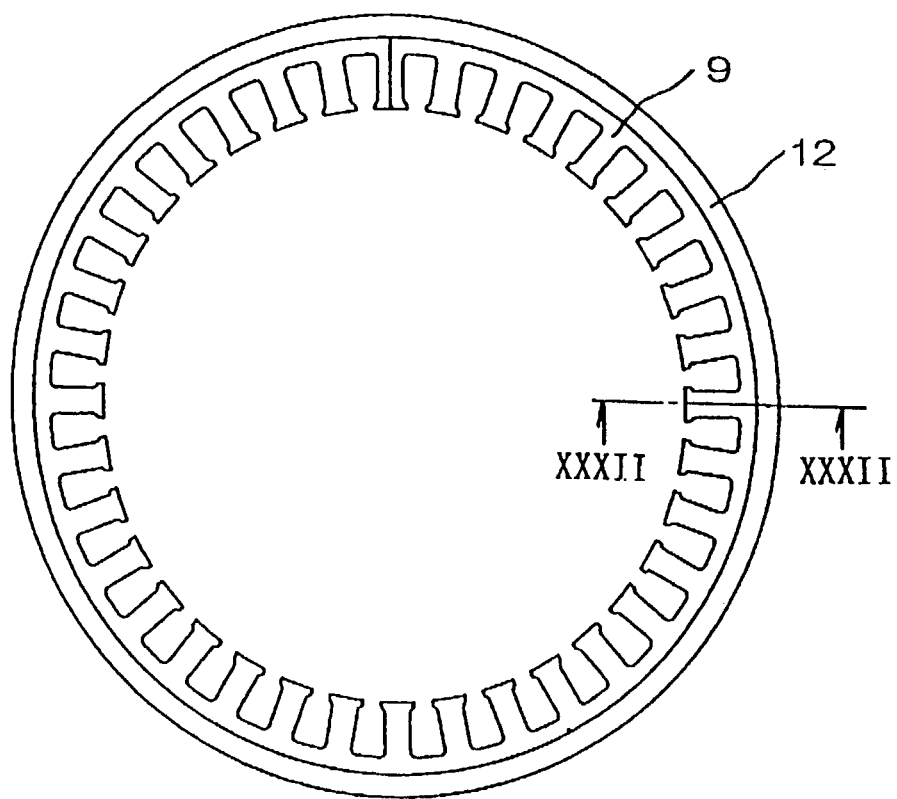
FIG. 31 is a front view showing a construction of a stator core of a stator for dynamo-electric machine according to Embodiment 10 of the invention.
Figure 32:
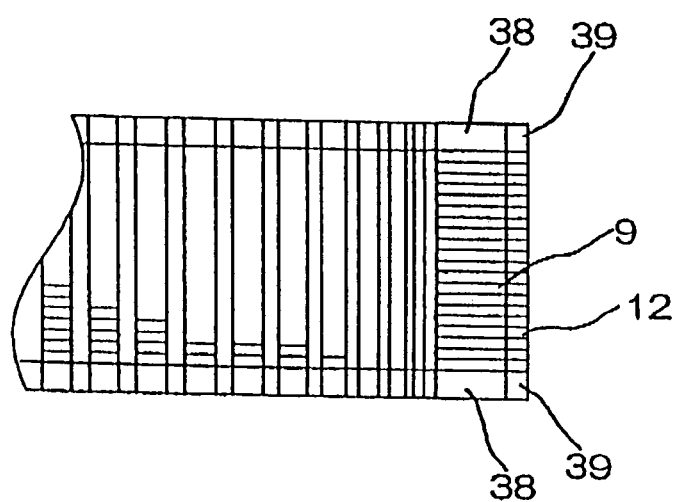
FIG. 32 is a sectional view taken along the line XXXII—XXXII in FIG. 31.
Figure 33:
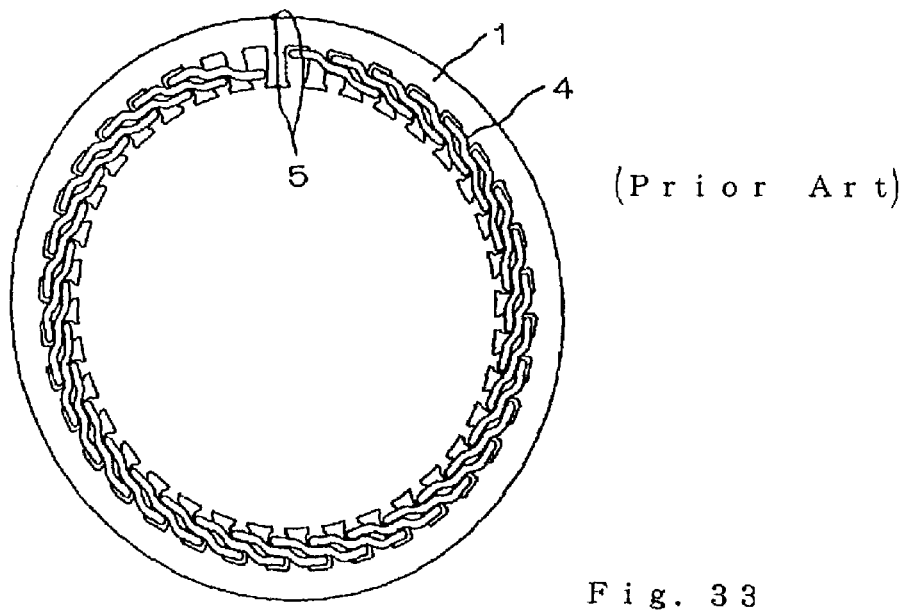
FIG. 33 is a front view showing a construction of a stator for dynamo-electric machine according to the prior art.
Figure 34:
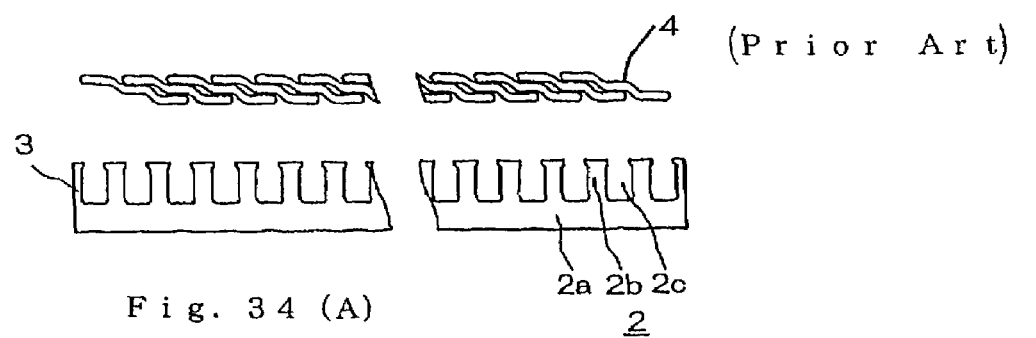
FIGS. 34 (A) and (B) show a manufacturing process of the stator core of the stator for dynamo-electric machine in FIG. 33.
Figure 34:
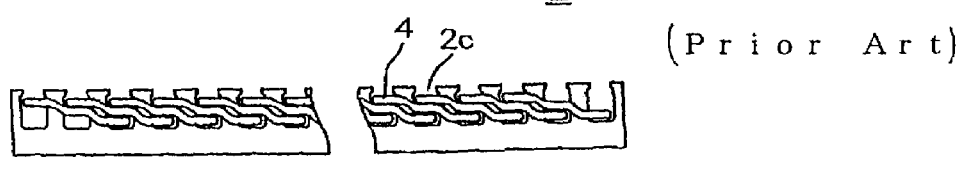
Figure 35:
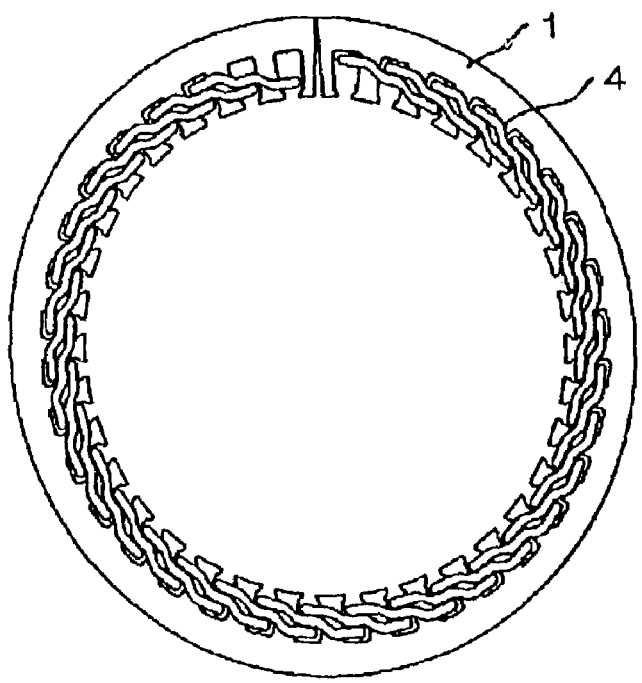
FIG. 35 is a view to explain the problem of the stator core in FIG. 34.

FIG. 31 is a front view showing a construction of a stator core of a stator for dynamo-electric machine according to Embodiment 10 of the invention. FIG. 32 is a sectional view taken along the line XXXII—XXXII in FIG. 31.

In the drawings, the same reference numerals are designated to the same or like parts as those described in the foregoing Embodiment 2, and further description thereof is omitted herein.

As shown in FIG. 32, numeral 38 and numeral 39 are plate-type magnetic members, each being laminated and integrated in one piece at both ends of the inside ring core 9 and the outside ring core 12 in axial direction. Thickness of the plate-type magnetic members 38 and 39 is larger than that of other plate-type magnetic members forming the inside ring core 9 and the outside ring core 12.

In this Embodiment 10, because both the plate-type magnetic members 38 and 39, whose thickness is larger than that of other plate-type magnetic members forming the inside ring core 9 and the outside ring core 12, are disposed respectively at two end portions in axial direction to hold both cores 9 and 12 therebetween, it is possible to prevent both the magnetic members 38 and 39 forming the core 9 and 12 from being removed from both end portions. Furthermore, though not illustrated, in the prior art, it has been necessary to apply a rounding work to both end portions of the slot of the inside ring core 9 so as not to damage the inserted coils. However, because thickness of the plate-type magnetic member forming the inside ring core 9 has been so small that there has been a disadvantage of difficulty in the rounding work and poor working efficiency. Such a disadvantage incidental to the prior art is overcome by this embodiment. That is, by disposing the plate-type magnetic member 38 of larger thickness, the rounding work is easy and it is possible to improve working efficiency.

What is claimed is:

1. A stator for dynamo-electric machine having a rotor disposed inside the stator, said stator comprising a core comprising an inner ring core and an outer ring core, wherein said inner ring core includes a plurality of axially laminated magnetic plate members which are bent to form a ring shape, and a plurality of coils;

said plurality of laminated magnetic plate members have one pair of end faces contacting each other, and inner circumferential portion of said inner ring includes a plurality of teeth and slots located between said teeth;

said plurality of coils are wound round said plurality of teeth adjacent each other between a bottom part of one of said slots and an upper part of other of said slots, and are disposed in such a manner as being radially overlapped on each other;

said outer ring core is cylindrical, formed of a magnetic material, fitted on an outer circumferential surface of said inner ring core and holds said inner ring core;

said outer ring core comprises at least one magnetic member having a ring shape and a one-piece construction, and said outer ring core and said inner ring core constitute a yoke; and a width of the teeth where the end faces of the laminated magnetic plate members contact each other is larger than a width of the other teeth.

2. The stator for dynamo-electric machine as defined in claim 1, wherein the outer ring core is formed by a plurality of laminated magnetic plate members.

3. The stator for dynamo-electric machine as defined in claim 2, wherein the laminated magnetic plate members forming the outer ring core are spirally wound.

4. A stator for dynamo-electric machine having a rotor disposed inside the stator, said stator comprising a core comprising an inner ring core and an outer ring core, wherein
   said inner ring core includes a plurality of axially laminated magnetic plate members which are bent to form a ring shape, and a plurality of coils;
   said plurality of laminated magnetic plate members have one pair of end faces contacting each other, and inner circumferential portion of said inner ring includes a plurality of teeth and slots located between said teeth;
   said plurality of coils are wound round said plurality of teeth adjacent each other between a bottom part of one of said slots and an upper part of other of said slots, and are disposed in such a manner as being radially overlapped on each other;
   said outer ring core is cylindrical, formed of a magnetic material, fitted on an outer circumferential surface of said inner ring core and holds said inner ring core;
   said outer ring core comprises at least one magnetic member having a ring shape and a one-piece construction, and said outer ring core and said inner ring core constitute a yoke; and
   a thickness of the laminated magnetic plate members forming the outer ring core is larger than a thickness of the laminated magnetic plate members forming the inner ring core.

5. A stator for dynamo-electric machine having a rotor disposed inside the stator, said stator comprising a core comprising an inner ring core and an outer ring core, wherein
   said inner ring core includes a plurality of axially laminated magnetic plate members which are bent to form a ring shape, and a plurality of coils;
   said plurality of laminated magnetic plate members have one pair of end faces contacting each other, and inner circumferential portion of said inner ring includes a plurality of teeth and slots located between said teeth;
   said plurality of coils are wound round said plurality of teeth adjacent each other between a bottom part of one of said slots and an upper part of other of said slots, and are disposed in such a manner as being radially overlapped on each other;
   said outer ring core is cylindrical, formed of a magnetic material, fitted on an outer circumferential surface of said inner ring core and holds said inner ring core;
   said outer ring core comprises at least one magnetic member having a ring shape and a one-piece construction, and said outer ring core and said inner ring core constitute a yoke; and
   a thickness of the laminated magnetic plate members forming the outer ring core is smaller than a thickness of the laminated magnetic plate members forming the inner ring core.

6. A stator for dynamo-electric machine having a rotor disposed inside the stator, said stator comprising a core comprising an inner ring core and an outer ring core, wherein
   said inner ring core includes a plurality of axially laminated magnetic plate members which are bent to form a ring shape, and a plurality of coils;
   said plurality of laminated magnetic plate members have one pair of end faces contacting each other, and inner circumferential portion of said inner ring includes a plurality of teeth and slots located between said teeth;
   said plurality of coils are wound round said plurality of teeth adjacent each other between a bottom part of one of said slots and an upper part of other of said slots, and are disposed in such a manner as being radially overlapped on each other;
   said outer ring core is cylindrical, formed of a magnetic material, fitted on an outer circumferential surface of said inner ring core and holds said inner ring core;
   said outer ring core comprises at least one magnetic member having a ring shape and a one-piece construction, and said outer ring core and said inner ring core constitute a yoke; and
   the outer ring core is formed shorter than the inner ring core in axial direction and is fitted in central part of the inner ring core.

7. The stator for dynamo-electric machine as defined in claim 1, wherein a thickness of the outer ring core in a radial direction is larger than that of a yoke portion in the inner ring core.

8. The stator for dynamo-electric machine as defined in claim 1, wherein a thickness of a yoke portion in the inner ring core in radial direction is larger than that of the outer ring core.

9. The stator for dynamo-electric machine as defined in claim 1, wherein concave portions extending in axial direction are respectively provided at positions each substantially corresponding to a central part of a bottom portion of each slot on an outside perimeter of the inner ring core.

10. The stator for dynamo-electric machine as defined in claim 1, wherein concave portions extending in axial direction are respectively provided at positions each substantially corresponding to a central part of a bottom portion of each slot of the inner ring core.

11. A stator for dynamo-electric machine having a rotor disposed inside the stator, said stator comprising a core comprising an inner ring core and an outer ring core, wherein
   said inner ring core includes a plurality of axially laminated magnetic plate members which are bent to form a ring shape, and a plurality of coils;
   said plurality of laminated magnetic plate members have one pair of end faces contacting each other, and inner circumferential portion of said inner ring includes a plurality of teeth and slots located between said teeth;
   said plurality of coils are wound round said plurality of teeth adjacent each other between a bottom part of one of said slots and an upper part of other of said slots, and are disposed in such a manner as being radially overlapped on each other;
   said outer ring core is cylindrical, formed of a magnetic material, fitted on an outer circumferential surface of said inner ring core and holds said inner ring core;
   said outer ring core comprises at least one magnetic member having a ring shape and a one-piece construction, and said outer ring core and said inner ring core constitute a yoke; and
   the outer ring core is formed by integrating a plurality of arc-shaped magnetic members in one piece.

12. A stator for dynamo-electric machine having a rotor disposed inside the stator, said stator comprising a core comprising an inner ring core and an outer ring core, wherein said inner ring core includes a plurality of axially laminated magnetic plate members which are bent to form a ring shape, and a plurality of coils;

said plurality of laminated magnetic plate members have one pair of end faces contacting each other, and inner circumferential portion of said inner ring includes a plurality of teeth and slots located between said teeth;

said plurality of coils are wound round said plurality of teeth adjacent each other between a bottom part of one of said slots and an upper part of other of said slots, and are disposed in such a manner as being radially overlapped on each other;

said outer ring core is cylindrical, formed of a magnetic material, fitted on an outer circumferential surface of said inner ring core and holds said inner ring core;

said outer ring core comprises at least one magnetic member having a ring shape and a one-piece construction, and said outer ring core and said inner ring core constitute a yoke; and concave and convex portions engaging with each other are formed on a face where the inner ring core and the outer ring core are fitted to each other.

13. The stator for dynamo-electric machine as defined in claim 12, wherein the concave and convex portions are formed to dovetail with each other.

14. The stator for dynamo-electric machine as defined in claim 1, wherein a portion where the inner ring core and the outer ring core are fitted to each other are joined by welding.

15. The stator for dynamo-electric machine as defined in claim 14, wherein the outer ring core is divided into parts in axial direction and portions where the parts are fitted are joined together by welding.

16. A stator for dynamo-electric machine having a rotor disposed inside the stator, said stator comprising a core comprising an inner ring core and an outer ring core, wherein said inner ring core includes a plurality of axially laminated magnetic plate members which are bent to form a ring shape, and a plurality of coils;

said plurality of laminated magnetic plate members have one pair of end faces contacting each other, and inner circumferential portion of said inner ring includes a plurality of teeth and slots located between said teeth;

said plurality of coils are wound round said plurality of teeth adjacent each other between a bottom part of one of said slots and an upper part of other of said slots, and are disposed in such a manner as being radially overlapped on each other;

said outer ring core is cylindrical, formed of a magnetic material, fitted on an outer circumferential surface of said inner ring core and holds said inner ring core;

said outer ring core comprises at least one magnetic member having a ring shape and a one-piece construction, and said outer ring core and said inner ring core constitute a yoke; and the laminated magnetic members of the inner ring core which are disposed at two end portions in axial direction are larger than the other laminated magnetic members of the inner ring core.

* * * * *